US008276461B2

(12) United States Patent
Zwygart

(10) Patent No.: US 8,276,461 B2
(45) Date of Patent: Oct. 2, 2012

(54) LIFTING MEMBER WITH LOAD AND/OR STRESS MEASURING MEANS

(75) Inventor: Beat Zwygart, Sciez (FR)

(73) Assignee: Lasstec, Sciez (FR)

( * ) Notice: Subject to any disclaimer, the term of this patent is extended or adjusted under 35 U.S.C. 154(b) by 512 days.

(21) Appl. No.: 12/301,798

(22) PCT Filed: May 24, 2007

(86) PCT No.: PCT/IB2007/001349

§ 371 (c)(1),
(2), (4) Date: Nov. 21, 2008

(87) PCT Pub. No.: WO2007/138418

PCT Pub. Date: Dec. 6, 2007

(65) Prior Publication Data

US 2010/0037700 A1 Feb. 18, 2010

(30) Foreign Application Priority Data

May 24, 2006 (FR) ..................................... 06 51916

(51) Int. Cl.
*G01L 1/10* (2006.01)
*G01L 1/24* (2006.01)
*G01L 5/00* (2006.01)

(52) U.S. Cl. ................... 73/800; 73/862.625; 73/862.56

(58) Field of Classification Search ............... 73/862.56, 73/862.57, 862.392, 862.393, 826, 828, 763, 73/768, 775, 800; 294/82.1–82.36
See application file for complete search history.

(56) References Cited

U.S. PATENT DOCUMENTS

| | | | | |
|---|---|---|---|---|
| 3,971,934 | A | 7/1976 | Coatta | |
| 5,038,622 | A * | 8/1991 | Tijmann | 73/862.393 |
| 5,392,660 | A * | 2/1995 | Hodson et al. | 73/862.393 |
| 5,429,007 | A * | 7/1995 | Khachaturian et al. | 73/862.474 |
| 5,594,819 | A * | 1/1997 | Narendran et al. | 385/12 |
| 5,945,665 | A * | 8/1999 | Hay | 250/227.14 |
| 5,973,317 | A * | 10/1999 | Hay | 250/227.14 |
| 6,073,496 | A | 6/2000 | Kühn | |
| 6,354,152 | B1 * | 3/2002 | Herlik | 73/597 |
| 7,026,557 | B2 * | 4/2006 | Rice et al. | 177/136 |
| 7,406,877 | B2 * | 8/2008 | Maurin | 73/800 |

FOREIGN PATENT DOCUMENTS

| | | | |
|---|---|---|---|
| EP | 1236980 | A1 | 9/2002 |
| EP | 1236980 | A1 * | 9/2002 |
| FR | 2726646 | A1 | 5/1996 |
| WO | 86/01303 | A1 | 2/1986 |
| WO | 2004/056017 | A1 | 7/2004 |

* cited by examiner

*Primary Examiner* — Lisa M. Caputo
*Assistant Examiner* — Jonathan Dunlap
(74) *Attorney, Agent, or Firm* — William H. Eilberg

(57) ABSTRACT

A lifting member transmits all or part of the lifting force between a lifting appliance and a load to be lifted. The lifting member includes a proximal portion configured to be fixed to the lifting appliance; a distal portion designed to be connected to the load; a longitudinal section, extending from the proximal portion towards the distal portion, and capable of being elastically elongated under the action of part of the lifting force; a longitudinal channel extending from the proximal portion into the longitudinal section of the lifting member; a stress transducer, inserted into the longitudinal channel, and fixed to the side wall of the longitudinal channel; a link for transmitting optical fiber signals from the stress transducer to a device for receiving and analyzing optical fiber signals from the stress transducer.

12 Claims, 5 Drawing Sheets

LIFTING MEMBER WITH LOAD AND/OR STRESS MEASURING MEANS

TECHNICAL FIELD OF THE INVENTION

The present invention concerns lifting members, intended to transmit all or part of a lifting force between a lifting device and a load to be lifted. Such lifting members are routinely used in fields such as civil engineering and handling cargo in ports.

Many accidents that have occurred when lifting loads were caused by uninformed users attempting to lift an excessive load, greater than the maximum load that it is possible to lift with their lifting machine.

To prevent such accidents, it has already been envisaged to effect measurements on the actuators of the lifting machines, for example on hydraulic rams thereof, and to obtain the weight of the load lifted by the lifting machine indirectly by calculation.

These indirect methods have proved dangerous, however, because they employ methods that use approximations and do not take sufficient account of the status of the structure of the lifting machine.

In the case of lifting machines that use a plurality of lifting members simultaneously, many accidents have also occurred as a result of only some of the lifting members lifting the load. For example, holding and lifting frames known as spreaders include multiple rotary latches adapted to interengage with the load and to lock onto it by virtue of them having complementary shapes. “Spreaders” are used among other things to lift and handle containers in ports by engagement of rotary latches in oblong holes disposed at the four top corners of the containers. Depending on the state of wear of the container and the impacts it has suffered, the oblong holes may be deformed and no longer enable such locking. Lifting is then effected with only some of the lifting members, which may result in an overload and the lifting members breaking.

The document EP 1 236 980 describes a stress sensor for lifting members, including:

- a support body and a pressure cap which together define at least one fluid compression chamber and are designed to be interposed between the lifting member and the load support,
- means for measuring the pressure inside the compression chamber.

This kind of stress sensor monitors the application of load to the lifting member and monitors the stress induced in the lifting member by the lifted load by measuring the pressure inside the compression chamber.

However, measuring stresses by measuring pressure proves relatively inaccurate, relatively unresponsive, and sensitive to temperature variations.

The slow response of this type of stress sensor does not allow the measurement of stresses induced in a lifting member in the event of impacts or sudden accelerations occurring when lifting the load. The same applies if vibrations are produced during the operation of lifting and handling the load.

This kind of stress measurement is necessarily effected remotely from the lifting member itself, and a result of this is a lack of accuracy in determining the stress to which the lifting member is really subjected.

Furthermore, this kind of stress sensor requires adding to the lifting member items that prove to be very bulky and difficult to adapt to all widely used lifting and handling machines.

SUMMARY OF THE INVENTION

A first problem addressed by the invention is that of accurately measuring a load and/or stresses induced in a lifting member when lifting a load.

At the same time, the invention seeks to have this measurement carried out as close as possible to the lifting member, to minimize the risks of errors that can result from calculations that use approximations.

Another aspect of the invention seeks to design a measuring device that is very durable, able to withstand impacts, insensitive to electromagnetic fields, and that necessitates no intentional calibration operation to compensate temperature variations.

The invention further seeks to design a device for measuring the weight of a load lifted by a lifting member and/or stresses induced by lifting a load, that is highly responsive and very fast, enabling real-time measurement.

A further aspect of the invention seeks to provide a compact measuring device that can easily be fitted to most of the existing lifting members that are widely used in the lifting field, which adaptation can be carried out without detectable modification of the properties of the lifting members.

To achieve the above and other objects, the invention proposes a lifting member, intended to transmit all or a portion of the lifting force between a lifting device and a load to be lifted, including:

- a proximal portion conformed to be fixed to the lifting device,
- a distal portion adapted to be connected to the load,
- a longitudinal portion, extending from the proximal portion in the direction of the distal portion, and adapted to be stretched elastically by the action of the portion of the lifting force, wherein:

- the longitudinal portion of the lifting member includes at least one longitudinal passage,
- an optical stress sensor is inserted into said at least one longitudinal passage and is fixed to the lateral wall of said at least one longitudinal passage, and
- connecting means are provided for transmitting the signals from the optical stress sensor to means for receiving and analyzing the signals from the optical stress sensor.

Using an optical stress sensor makes measuring the load and/or the stresses induced in the lifting member by lifting the load highly responsive and very accurate.

The optical stress sensor is advantageously fixed to the lateral wall of the longitudinal passage in at least first and second fixing areas located at a distance from each other in the longitudinal direction of the longitudinal passage.

When lifting a load, the longitudinal portion of the lifting member is stretched elastically by the lifting force. This stretching of the longitudinal portion varies the distance between the two fixing areas, which causes a variation in the signals from the optical stress sensor, from which variation the stress state induced in the lifting member by the load and/or the weight of the load lifted by the lifting member can be directly deduced.

The first and second fixing areas can preferably be in a constant diameter area of the longitudinal portion of the lifting member.

This kind of arrangement avoids the use of approximations in calculations for evaluating the stresses and/or the weight of the load from the signals coming from the optical fiber stress sensor. This avoids having to carry out a calculation taking into account the respective stretching of different portions with different cross-sections that will be stretched differently under the same load. Such calculations are often no more than a simple approximation based on the geometry of the lifting member and the connecting portions between the portions with different cross-sections. Stress concentration phenomena can nevertheless occur that are difficult to take into account in the calculations and are efficiently circumvented by the particular disposition of the first and second fixing areas.

The longitudinal passage can advantageously be disposed at the centre of the cross-section of the longitudinal portion of the lifting member.

Thus the optical stress sensor is inserted into the neutral fiber of the longitudinal portion of the lifting member. The stress measured by the optical stress sensor is therefore a pure axial stress. The measurement is therefore not adversely affected by any flexing of the lifting member, which would otherwise falsify the calculation of the weight of the lifted load.

Various types of optical stress sensor can be used, provided that they can be at least partly accommodated in the longitudinal passage in the lifting member.

A first option is for the optical stress sensor to be an optical fiber optical sensor, said optical fiber being fastened to the lateral wall of the longitudinal passage in the first and second fixing areas. This kind of structure is compact and robust and can be connected by the same optical fiber to remotely sited receiver and analyzer means.

The optical fiber can advantageously be bonded into a metal tube in turn bonded into the longitudinal passage.

See the document WO 86/01303 concerning a Bragg grating optical fiber sensor for information on the production and use of the above kind of optical fiber stress sensor.

See also the document WO 2004/056017, which describes the use and operation of means for receiving and analyzing signals from this kind of optical fiber stress sensor.

A second option is for the optical stress sensor to include a laser rangefinder adapted to produce a signal imaging the stretching of the longitudinal portion of the lifting member.

In a first embodiment of the invention, the distal portion of the lifting member can be hook-shaped.

In a second embodiment of the invention, the distal portion of the lifting member can be T-shaped.

This adapts the invention to the lifting members most widely used in the field of civil engineering or in the field of handling cargo in ports.

One or more lifting members according to the invention can advantageously be provided on a load holding and lifting frame.

Another aspect of the invention proposes a device for measuring and analyzing a load, including at least one lifting member as explained hereinabove, in which the receiving and analyzing means can process the signals coming from the optical stress sensor to determine one or more of the following parameters:

- the weight lifted by said at least one lifting member,
- the stress state of said at least one lifting member,
- the duration of application of the loads and their intensity,
- the number of cycles performed by said at least one lifting member, and
- the load and/or stress spectrum of said at least one lifting member.

The load and/or stress spectrum is used to estimate the fatigue state of the lifting member. Replacement of the lifting member can therefore be scheduled in total safety.

The device for measuring and analyzing a load can preferably include a plurality of lifting members for handling the same load simultaneously and the receiving and analyzing means can process the signals coming from a plurality of optical stress sensors to determine one or both of the following parameters:

- the location of the center of gravity of the load, and
- the lifting force exerted by each lifting member.

The load measuring and analysis device can advantageously be used on a lifting device such as a handling gantry, a container gantry, a crane, a mobile crane, a stacker or a front loader with a forklift frame.

BRIEF DESCRIPTION OF THE DRAWINGS

Other objects, features and advantages of the present invention emerge from the following description of particular embodiments, which is given with reference to the appended drawings, in which.

DESCRIPTION OF THE PREFERRED EMBODIMENTS

Figure 1:
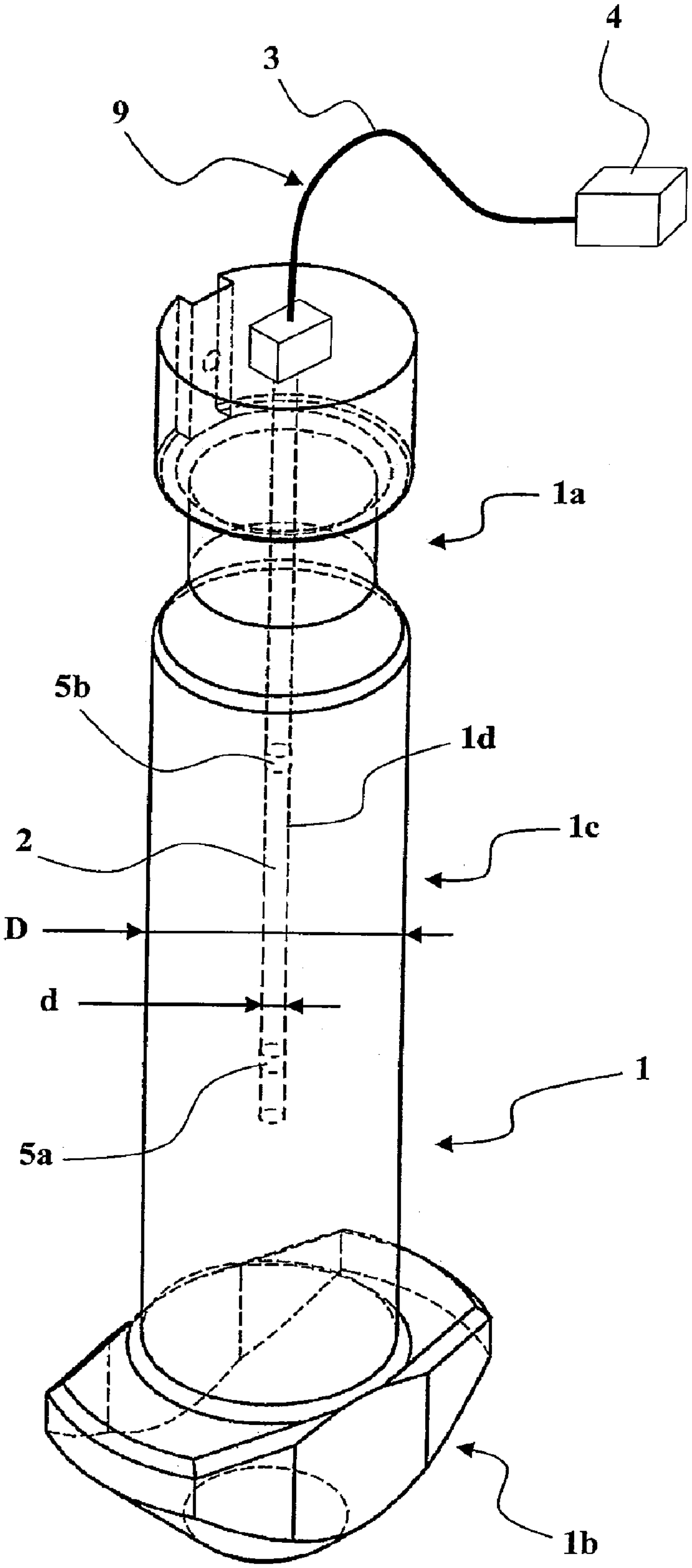
FIG. 1 is a perspective view of a first embodiment of a lifting member according to the invention.
Figure 2:
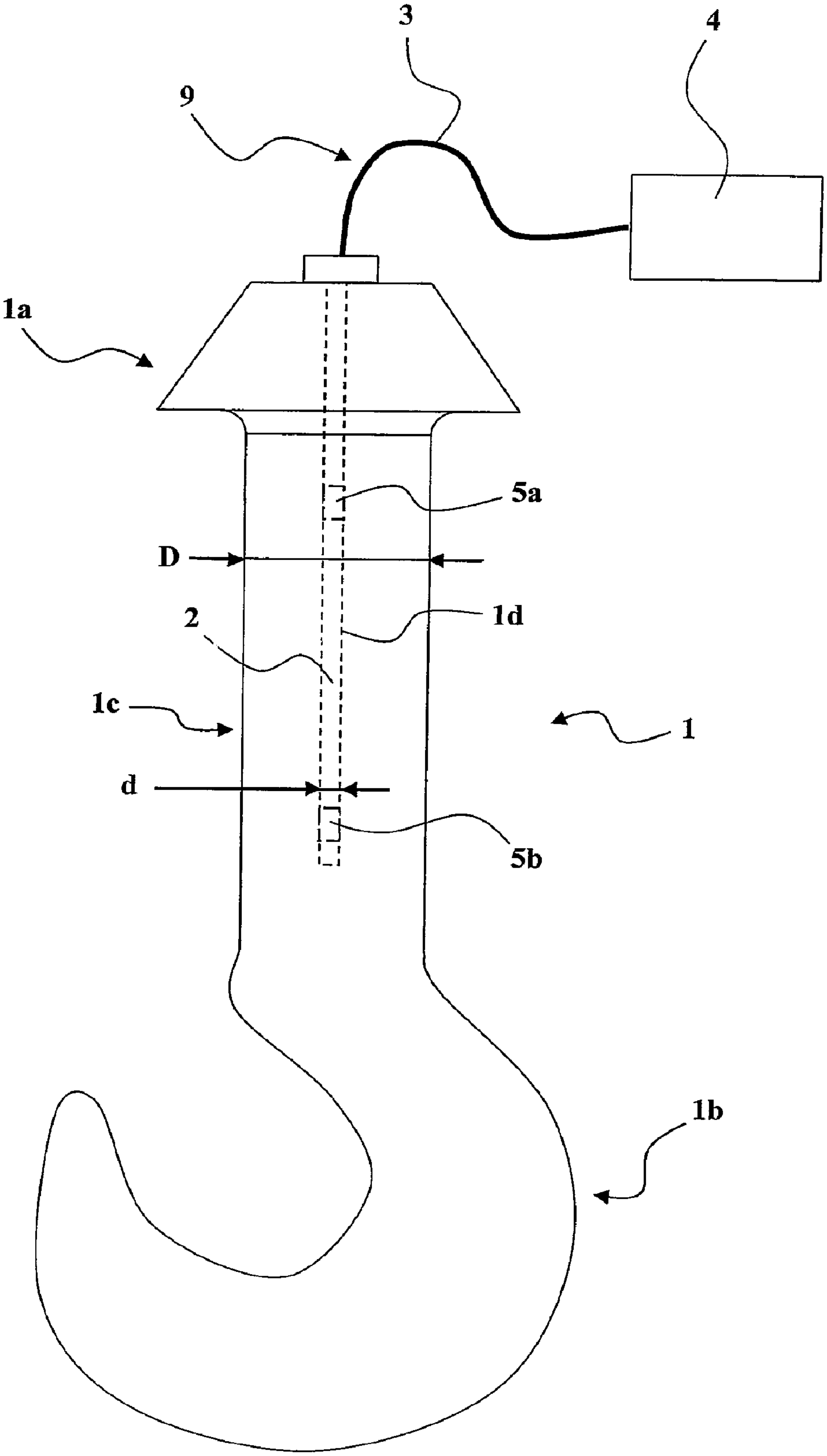
FIG. 2 is a diagrammatic side view of a second embodiment of a lifting member according to the invention.

FIGS. 1 and 2 represent a lifting member 1 including:

- a proximal portion 1*a* conformed to be fixed to the lifting device,
- a distal portion 1*b* adapted to be connected to the load,
- a longitudinal portion 1*c* extending from the proximal portion 1*a* toward the distal portion 1*b* and adapted to be stretched elastically by a load lifting force.

The longitudinal portion 1*c* of the lifting member 1 includes a blind longitudinal passage 1*d* extending from the proximal portion 1*a*. An optical stress sensor 2 is inserted into the longitudinal passage 1*d* and is fixed to the lateral wall of the longitudinal passage 1*d*. The optical stress sensor 2 can be fixed to the lateral wall by means of a widely used epoxy resin.

The longitudinal passage 1*d* is blind and extends from the proximal portion 1*a* of the lifting member 1. This kind of configuration does not impact on the distal portion 1*b*, which is the "active" portion of the lifting member 1 for attaching the load. Alternatively, the longitudinal passage 1*d* can be open-ended, for example, to facilitate inserting and/or extracting the optical stress sensor 2.

Connecting means 3 are provided for transmitting signals from the optical stress sensor 2 to means 4 for receiving and analyzing signals from the optical stress sensor 2.

In the embodiments shown in FIGS. 1 and 2, the optical stress sensor 2 is fixed to the lateral wall of the longitudinal passage 1*d* in two fixing areas 5*a* and 5*b* spaced from each other in the longitudinal direction of the longitudinal passage 1*d*.

When a load attached to the distal portion 1*b* of the lifting member 1 is lifted, the longitudinal portion 1*c* is stretched elastically by the lifting force.

Being fixed to the lateral wall of the longitudinal passage 1*d* in the fixing areas 5*a* and 5*b*, the optical stress sensor 2 also undergoes a variation in length. That variation in length varies the signals sent from the optical stress sensor 2 to the receiving and analyzing means 4 via the connecting means 3. The variation in the signals from the optical stress sensor 2 is directly linked to the stretching to which the optical stress sensor 2 is subjected.

The stretching of the optical stress sensor 2 can be deduced from the variation in the signals coming from that optical stress sensor 2, and is considered substantially equal to the elastic stretching of the longitudinal portion 1*c* between the fixing areas 5*a* and 5*b*. Knowing the material of the lifting member 1 and its mechanical characteristics, it is very easy to deduce the stresses induced in the lifting member 1 by the load, by means of a calculation well known to the person skilled in the art. Those stresses are directly related to the weight of the load fixed to the distal portion 1*b* of the lifting member 1. It is therefore also possible to determine the weight of the load lifted by the lifting member 1.

The lifting member 1 itself therefore constitutes means for measuring the weight of the load. Thus the stresses induced in the lifting member are measured internally, as close as possible to it, which limits the risk of errors that can occur when calculations use approximations.

In a first embodiment of the invention, an optical fiber optical stress sensor 2 may advantageously be used as the optical stress sensor 2.

In this kind of optical fiber optical stress sensor 2, the optical fiber is attached to the lateral wall of the longitudinal passage 1*d* in the first fixing area 5*a* and the second fixing area 5*b*, an intermediate portion of the optical fiber being situated between the two fixing areas 5*a* and 5*b*. Upon stretching of the longitudinal portion 1*c* of the lifting member 1 under load, there occurs the same stretching of the intermediate optical fiber portion, and that stretching produces a corresponding variation in the optical properties of the optical fiber. By launching an appropriate light wave into the optical fiber, and analyzing the reflected wave, the variation in the length of the longitudinal portion 1*c* of the lifting member 1 can be determined, and the load to which the lifting member is subjected can be deduced therefrom.

In practice, the optical fiber can extend beyond the lifting member 1 to a box containing both the light source and means for receiving and analyzing signals coming from the optical stress sensor.

In the case of a movable lifting member, an optical fiber protected by a sheath may advantageously be used. The optical fiber can have a diameter of approximately 0.2 mm, for example, and can be protected by a layer of wax enveloped in a layer of rubber, itself enveloped in a metal braid also enveloped in a layer of rubber, the whole having a diameter of approximately 5 mm. This kind of fiber can be bent to radii of approximately 10 cm, enabling it to be coupled in parallel with other connecting means such as electrical cables and hydraulic hoses. The box can be 5 to 10 m away from the lifting member without loss of efficiency of the load measuring means.

In the area intended to be inserted into the lifting member, the optical fiber can be bonded into a metal tube itself bonded into the longitudinal passage 1*d*.

In the longitudinal portion 1*c* of the lifting member 1, the optical fiber, of 0.2 mm diameter, for example, can be bonded into a metal tube the inside diameter of which is approximately 0.6 mm and the outside diameter of which is approximately 3 mm, the tube being itself bonded into the longitudinal passage 1*d*.

The optical fiber optical stress sensor 2 may be an optical stretch sensor using a Bragg grating optical fiber, for example. This is a sensor in which a single-mode optical fiber includes a portion whose refractive index is modulated periodically along the optical fiber with a particular pitch by intense ultraviolet radiation. The fiber portion with the periodically modulated refractive index is called a Bragg grating. This Bragg grating causes reflection of light waves traveling in the optical fiber, at a wavelength called the Bragg wavelength, which is substantially twice the pitch of the modulation of the refractive index along the optical fiber in the Bragg grating. Consequently, the wavelength of light reflected by the Bragg grating is substantially proportional to the distance between two variations of the refractive index of the optical fiber, and any variation of this distance, for example as a result of stretching, can be detected by measuring the light wavelength reflected.

Other types of optical fiber stretching sensors may be used, however, such as a Fabry-Perot interferometer sensor for example.

Using an optical fiber optical stress sensor 2 enables fast and highly reliable measurement. This measurement is also simple to make independent of temperature variations by means of mathematical formulae, as indicated in the document WO 86/01303. Alternatively, an additional optical fiber optical stress sensor can be used, that is free of stress and is not subjected to a load, in order to use its signal to compensate temperature variations.

Another embodiment of the invention uses as the optical stress sensor 2 a laser rangefinder adapted to produce a signal imaging the stretching of the longitudinal portion 1*c* of the lifting member 1. In this case, a laser diode at the inlet of the longitudinal passage 1*d* emits pulses of light that are reflected in the vicinity of the far end of the passage 1*d*, and a sensor receives the reflected wave. The round trip transit time of the light in the longitudinal passage 1*d* is then measured to deduce therefrom its length and any stretching thereof under load.

As in the preceding embodiment, a blind tube may be bonded into the longitudinal passage, the light path lying inside the blind tube.

This kind of laser rangefinder can be similar to those widely used to measure short distances.

The use of an optical stress sensor 2, because of its responsiveness and speed of measurement, enables measurement of high transient stresses that can occur very briefly during impacts and vibrations occurring during a lifting operation, and without the optical stress sensor 2 being damaged by these impacts or vibrations. This provides a better indication of the fatigue state of the lifting member 1 and enables its preventive replacement to be scheduled if it has been or may have been damaged by earlier lifting operations. It is in fact possible to determine in real time the load and/or stress state of the lifting member 1, and thereby to establish accurately and reliably its load and/or stress spectrum.

As seen in FIGS. 1 and 2, the optical stress sensor 2 is directly integrated into the lifting member 1, whose functional external shape is not modified. The lifting members 1 represented in FIGS. 1 and 2 can therefore still be fitted to all the lifting machines for which they were originally intended.

An optical fiber optical stress sensor 2 has a very small diameter d, with the result that the mechanical strength of the lifting member 1 is hardly affected, if at all, by the presence of the longitudinal passage 1*d*.

In FIGS. 1 and 2, the fixing areas 5*a* and 5*b* are arranged in a constant diameter area of the longitudinal portion 1*c* of the lifting member 1.

The optical stress sensor 2 is stretched in the same way as the area of the lifting member 1 between the first fixing area 5*a* and the second fixing area 5*b*. This area having a constant diameter D, it is stretched linearly as a function of the load fixed to the distal portion 1*b* of the lifting member 1.

The stress induced in the lifting member 1, and the weight of the load, are therefore easy to determine without additional calculation and thus without risk of errors through using approximations in the calculations.

In the embodiments shown in FIGS. 1 and 2, the longitudinal passage 1*d* is at the centre of the cross-section of the longitudinal portion 1*c* of the lifting member 1.

The optical stress sensor 2 is therefore accommodated in the neutral fiber of the longitudinal portion 1*c* of the lifting member 1. This enables measurement of a pure axial stress exerted on the lifting member 1. The measurement is then not adversely affected by any effects of bending of the lifting member 1. If this were not the case, with an eccentrically positioned optical stress sensor 2, bending effects could reduce or increase the stress calculated by the receiving and analyzing means 4 from the signals produced by the optical stress sensor 2.

In the first embodiment shown in FIG. 1, the distal end 1*b* of the lifting member 1 is "T-shaped".

It is a rotary latch, usually named "twistlock", widely used in ports in handling devices for lifting and handling containers.

In the embodiment shown in FIG. 2, the distal portion 1*b* of the lifting member 1 is hook-shaped. The lifting member 1 represented in FIG. 2 is widely used in many lifting devices, for example in cranes in the field of civil engineering.

In FIGS. 1 and 2, the lifting member 1 and the receiving and analyzing means 4 constitute a load measuring and analyzing device 9. This load measuring and analyzing device 9 allows to determine one or more of the following parameters:

the weight lifted by the lifting member 1, the stress state of the lifting member 1, the duration of application of loads and their intensity, the number of cycles performed by the lifting member 1.

By establishing the load and/or stress spectrum of the lifting member 1, it is therefore possible to effect a reliable diagnosis of the lifting member 1, and to schedule its replacement before it is broken through excessive or unsuitable use.

This load measuring and analyzing device 9 can also be connected to a safety device (not shown) provided on the lifting device, that is adapted to cut off the supply of power to the lifting device if the load measuring and analyzing device 9 detects a load greater than the maximum load that can be lifted by the lifting member 1, or greater than the maximum load that the lifting member can lift safely.

This kind of load measuring and analyzing device 9 can also be used to monitor the fatigue and stress state of the lifting member 1. Thus any residual stresses in the lifting member 1, or non-elastic behavior of the longitudinal portion 1*c*, indicating the onset of plastic deformation of the lifting member 1 that may cause it to break can easily be identified.

Figure 3:
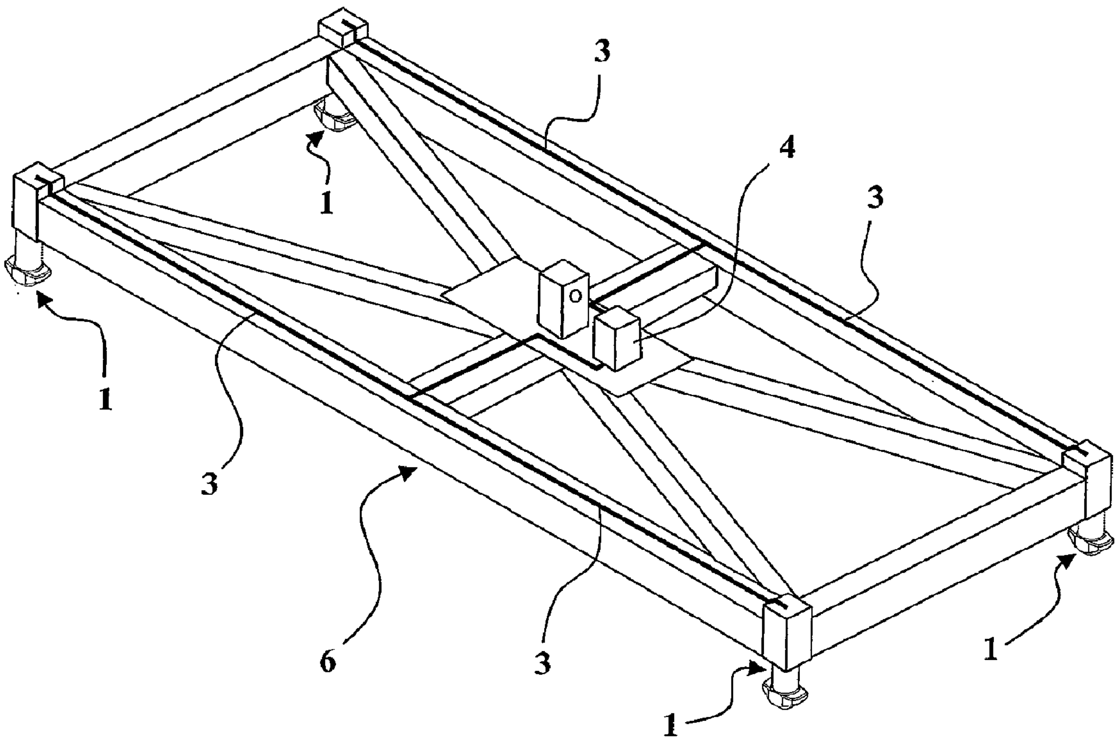
FIG. 3 is a perspective view of a load holding and lifting frame including a plurality of lifting members.
Figure 4:
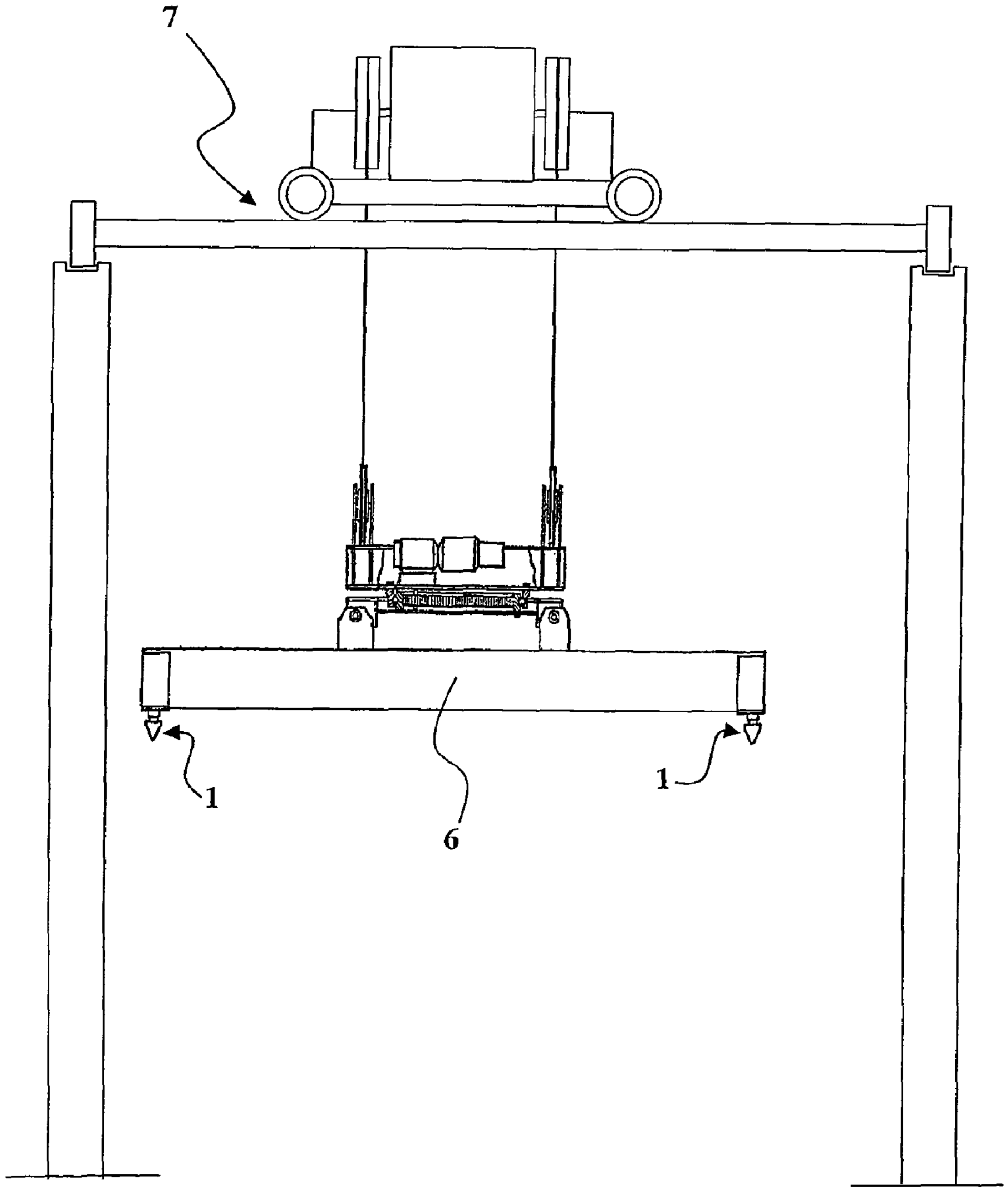
FIGS. 4 and 5 show different uses of the device from FIG. 3.
Figure 5:
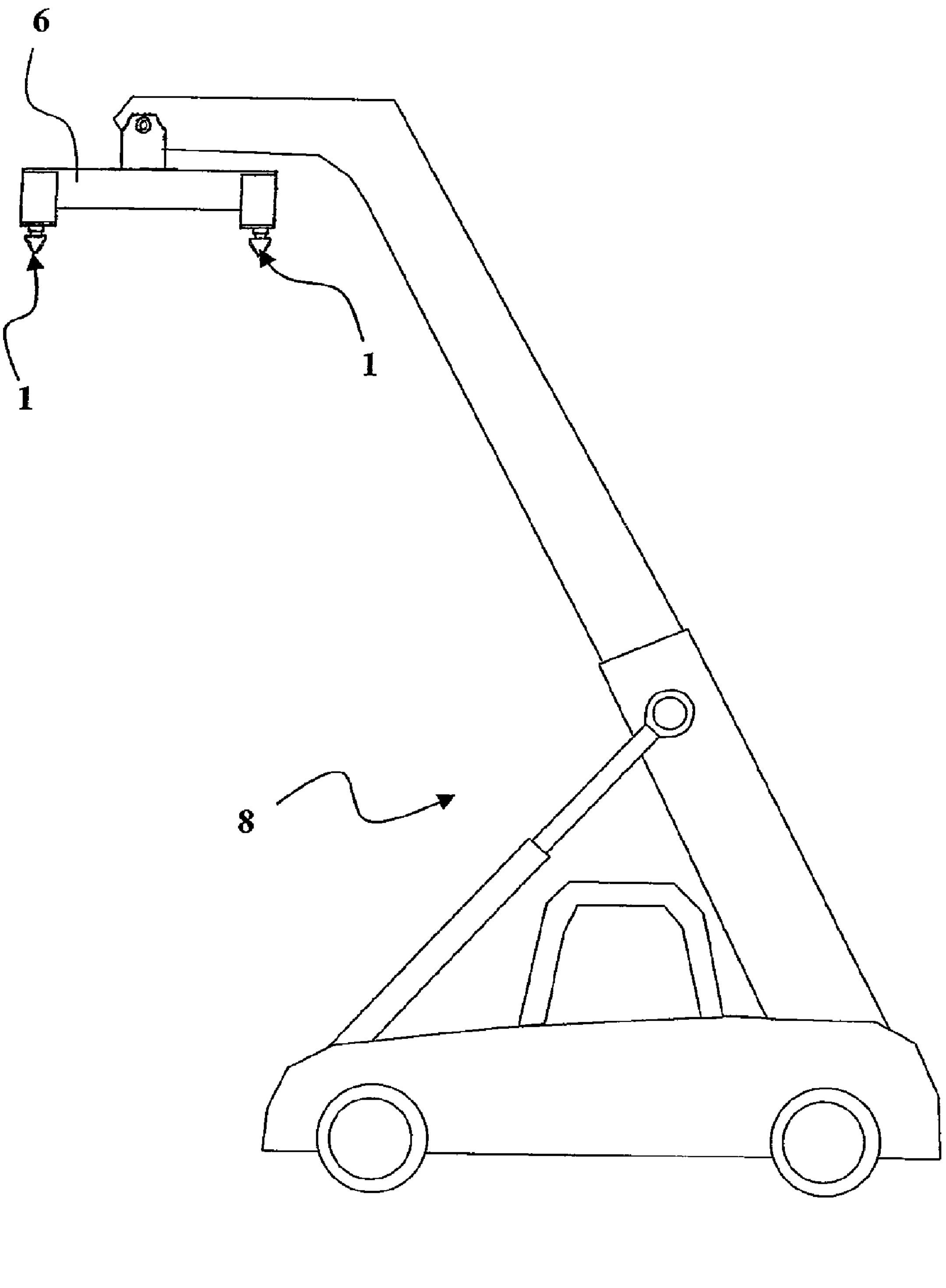

FIG. 3 represents a handling and lifting frame 6 including four lifting members 1 conforming to the embodiment shown in FIG. 1. The lifting members 1 are disposed at the four corners of the frame 6, which frame 6 can be used interchangeably on a handling gantry 7 or a crane, as shown in FIG. 4, or with a front loader with a forklift frame 8, as shown in FIG. 5.

In the frame 6 shown in FIG. 3, the lifting members 1 are all provided with optical fiber optical stress sensors connected by sheathed optical fiber connecting means 3 to common receiving and analyzing means 4 that sequentially analyze signals coming from the optical fiber optical stress sensors (not shown) contained in the lifting members 1. The receiving and analyzing means 4 examine the light waves reflected by the optical fibers, and deduce therefrom the stretching of each lifting member 1 and therefore the value of the load that it supports.

The receiving and analyzing means 4 can therefore process the signals coming from the optical fiber optical stress sensors (not shown) contained in the lifting members 1 to determine one or more of the following parameters:

the weight lifted by each lifting member 1, the stress state of each lifting member 1, the number of cycles performed by each lifting member 1, the location of the center of gravity of the load.

Knowing the weight lifted by each lifting member 1, the precise location of the center of gravity of the load can be deduced, preventing accidents that could occur because of an eccentric location of the center of gravity of the load when lifting it. This prevents all risk of untimely tilting of a lifting device caused by lifting a load whose weight, although less than the maximum weight limit of the device, has an eccentric center of gravity.

Similarly, knowing the weight lifted by each lifting member 1 indicates if each of the lifting members 1 is actually loaded and contributing to lifting the load. Thus any attempt to lift a load can be stopped if any of the lifting members 1 is not contributing enough or at all, and the other lifting members 1 are supporting an excessive load. This effectively increases the safety of the lifting device and personnel moving around in the immediate environment of the device.

Although the holding and lifting frame 6 represented in FIGS. 3 to 5 includes only four lifting members 1, it is possible to envisage a greater number of lifting members 1, arranged differently for simultaneously lifting more than one container.

The present invention is not limited to the embodiments explicitly described, and encompasses diverse variants and generalizations thereof within the scope of the following claims.

The invention claimed is:

1. Lifting member (1) intended to transmit all or a portion of a longitudinal lifting force between a lifting device and a load to be lifted, including:

a proximal portion (1*a*) conformed to be fixed to the lifting device, a distal portion (1*b*) adapted to be connected to the load, a longitudinal portion (1*c*), extending from the proximal portion (1*a*) in the direction of the distal portion (1*b*), and adapted to be stretched elastically by the portion of the longitudinal lifting force, wherein the distal portion (1*b*) of the lifting member comprises a rotary latch having a "T"-shape, the "T"-shaped latch including a shoulder portion having an oblong shape, and wherein:

the longitudinal portion (1*c*) of the lifting member (1) includes at least one longitudinal passage (1*d*), an optical stress sensor (2) is inserted into said at least one longitudinal passage (1*d*) and is fixed to the lateral wall of said at least one longitudinal passage (1*d*), said optical stress sensor (2) produces a signal imaging the longitudinal stretching of the longitudinal portion (1*c*) of the lifting member (1), and connecting means (3) are provided for transmitting the signals from the optical stress sensor (2) to means (4) for receiving and analyzing the signals from the optical stress sensor (2).

2. Lifting member (1) according to claim 1, wherein the optical stress sensor (2) is fixed to the lateral wall of the longitudinal passage (1*d*) in at least a first fixing area (5*a*) and a second fixing area (5*b*) situated at a distance from each other in the longitudinal direction of the longitudinal passage (1*d*).

3. Lifting member (1) according to claim 2, wherein the first fixing area (5*a*) and the second fixing area (5*b*) are in an area of constant diameter (D) of the longitudinal portion (1*c*) of the lifting member (1).

4. Lifting member (1) according to claim 1, wherein the longitudinal passage (1*d*) is blind, extends from the proximal portion (1*a*), and is disposed at the centre of the cross-section of the longitudinal portion (1*c*) of the lifting member (1).

5. Lifting member according to claim 1, wherein the optical stress sensor (2) is an optical fiber optical sensor, the optical fiber being fastened to the lateral wall of the longitudinal passage (1*d*) in the first fixing area (5*a*) and the second fixing area (5*b*).

6. Lifting member according to claim 1, wherein the optical stress sensor (2) includes a laser rangefinder.

7. Holding and lifting frame (6), including at least one lifting member (1) according to claim 1.

8. Device (9) for measuring and analyzing a load, including at least one lifting member (1) according to claim 1, and wherein the receiving and analyzing means (4) process the signals coming from the optical stress sensor (2) to determine one or more of the following parameters:

the weight lifted by said at least one lifting member (1), the stress state of said at least one lifting member (1), the duration of application of the loads and their intensity, the number of cycles performed by said at least one lifting member (1), and the load and/or stress spectrum of said at least one lifting member (1).

9. Device (9) according to claim 8, including a plurality of lifting members (1) for handling the same load simultaneously, and wherein the receiving and analyzing means (4) process the signals coming from a plurality of optical stress sensors (2) to determine one or both of the following parameters:

the location of the center of gravity of the load, and the lifting force exerted by each lifting member (1).

10. Device according to claim 8, wherein the lifting device is a handling gantry (7).

11. Device according to claim 8, wherein the lifting device is a crane.

12. Device according to claim 8, wherein the lifting device is a front loader with a forklift frame (8).

* * * * *